March 31, 1942. H. C. DREIBUSS ET AL 2,277,963
CAR TRUCK
Filed March 31, 1941 2 Sheets-Sheet 2
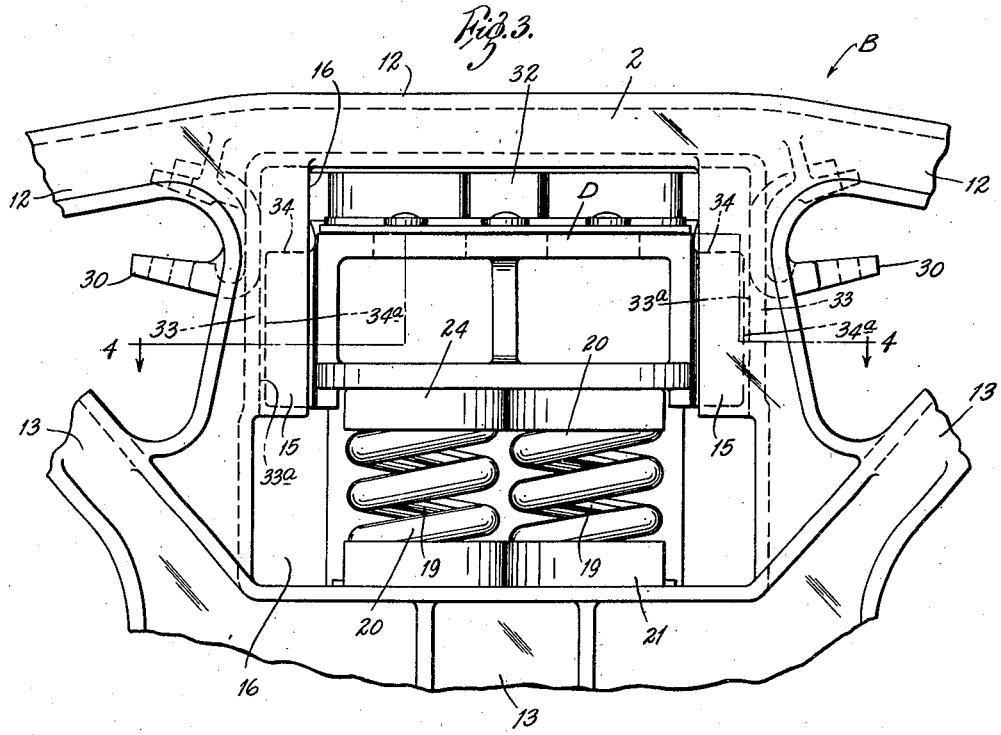
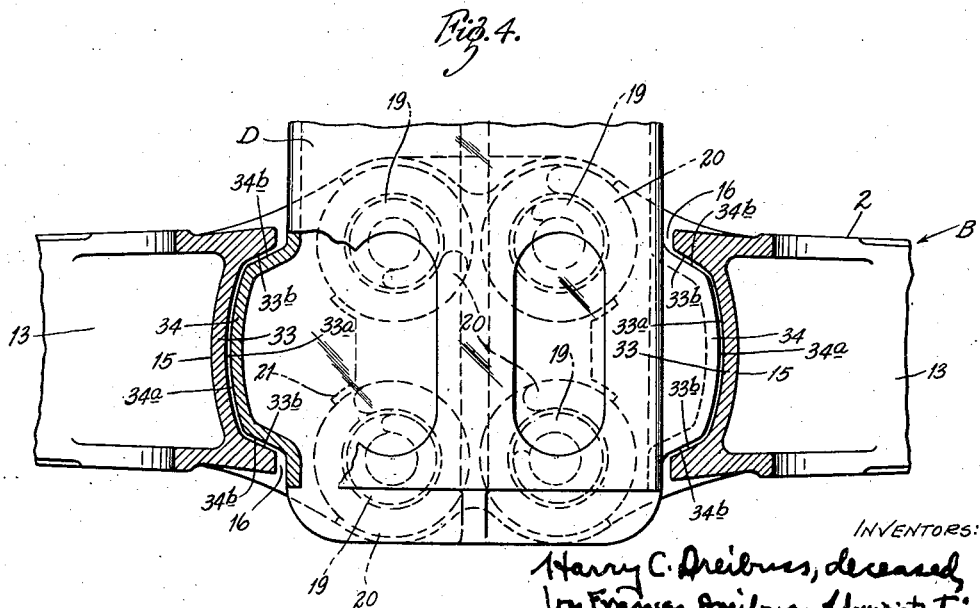

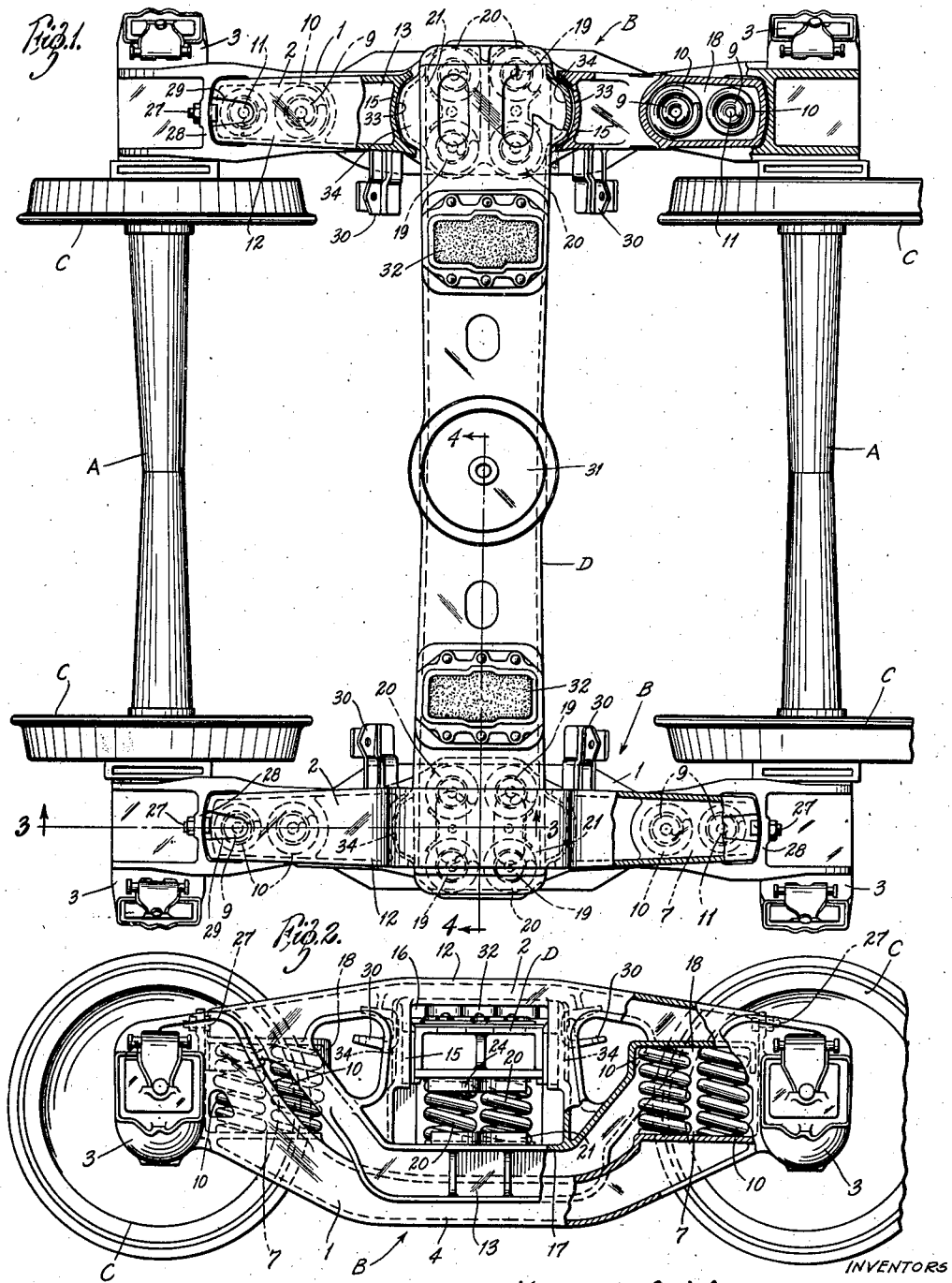

Patented Mar. 31, 1942

2,277,963

UNITED STATES PATENT OFFICE 2,277,963

CAR TRUCK

Harry C. Dreibuss, deceased, late of St. Louis, Mo., by Frances Dreibuss administratrix, St. Louis, Mo., and Fred H. Spenner, St. Louis, Mo., assignors to Scullin Steel Co., St. Louis, Mo., a corporation of Missouri Application March 31, 1941, Serial No. 386,100

2 Claims. (Cl. 105—197.2)

The subject matter hereof is divided out of Dreibuss and Spenner application Serial No. 270,954, filed May 1, 1939, for patent for Car truck upon which Letters Patent No. 2,236,566 were granted April 1, 1941.

This invention relates to car trucks. It has for its principal objects to devise a strong, durable and lightweight truck that will provide for simplicity of construction of the parts and consequent economical casting thereof and, at the same time, provide efficient swivel connections between the truck bolster and side frames that will permit one side frame to run in advance of the other when the truck is traveling over curved track. The invention consists in the car truck and in the construction, combinations and arrangements of parts hereinafter described and claimed.

In the accompanying drawings, which form part of this specification and wherein like symbols refer to like parts wherever they occur, Fig. 1 is a part plan and part horizontal section view of a car truck embodying said invention, Fig. 2 is a side elevational view of said truck with parts thereof shown in vertical longitudinal section, Fig. 3 is an enlarged fragmentary side elevational view of said truck in the region of the bolster supporting portion thereof, and Fig. 4 is a horizontal section on the line 4—4 in Fig. 3.

Said car truck comprises a pair of axles A connected at their corresponding ends by side frames B, wheels C rigid with said axles adjacent to the inner sides of said side frames, and a cast metal bolster D connecting said side frames midway of said axles. Each of the truck side frames B comprises two sections, an integral lower or journal box connecting section 1 and an integral upper or bolster supporting section 2.

The lower side frame section 1 has journal boxes 3 formed integral with the ends thereof and is offset downwardly, as at 4, between said boxes. The lower side frame section has inwardly and upwardly opening flat-bottomed pockets 7 formed therein adjacent to the journal boxes 3 that are adapted to receive and support two unit nests of springs, each unit preferably comprising vertically disposed reversely wound inner and outer helical coil springs 9 and 10, respectively, that are held in place at their lower ends by upstanding lugs 11 in the bottoms of said pockets.

The upper side frame section 2 comprises compression and tension members 12 and 13, respectively, that converge towards the ends of said section and are connected intermediate said ends by spaced column guides 15 to form a bolster opening 16. The tension member 13 of the upper side frame section has a longitudinal channel 17 in the underside thereof adapted to receive the depressed middle portion 4 of the lower side frame section; and the ends of said upper section extend into the pockets 7 in said lower section and seat on the upper ends of the double coil springs therein. As shown in the drawings, said ends of said upper section have downwardly opening pockets 18 that receive and retain the upper ends of said springs therein.

The bolster D is yieldably supported in the bolster opening 16 of each upper side frame section 2 preferably by means of a four unit nest of helical coil springs, each unit preferably comprising reversely wound inner and outer coils 19 and 20, respectively, the lower ends of said springs being seated in a flanged spring seat 21 that rests on the top of the tension member 13 of the upper side frame section. The upper ends of the bolster springs seat in a downwardly flanged spring seat 24 which bears against the underside of the bolster. The two sections of each side frame are removably secured together against vertical separation preferably by means of bolts 27 that extend through upstanding horizontal cross-webs 28 formed in the lower side frame section opposite the ends of the upper side frame section with their heads seated in upwardly opening notches 29 in said ends of said upper section.

The upper side frame section has suitable brake hanger brackets 30 formed integral therewith that project inwardly from the column guides 15. The bolster has an upstanding center plate ring 31 formed integral therewith and is also provided with suitable side bearings 32.

The bolster has swivel connections with the respective side frames that permit one side frame of the truck to run in advance of the other side frame and horizontal angling of the bolster when the truck is traveling over a curved track. Each of these connections comprises a vertical channel 33, which is formed in the bolster opposing side of the column guide 15 of the upper side frame section 2, and a hollow outstanding vertical rib 34 which is cast integral with the adjacent side wall of the bolster and seats in said channel. As shown in the drawings, the vertical channel 33 in each column guide 15 has a continuous transversely concave bottom surface 33a terminating near the ends of the bolster opening 16 in plane side surfaces 33b that diverge towards the bolster and make relatively wide obtuse angles with said concave bottom surface; and the vertical bolster rib 34 that cooperates with said vertical channel has a continuous transversely convex surface 34a curved in conformity with the concave bottom surface thereof, and plane side surfaces 34b that converge towards said convex surface and conform to and cooperate with said plane side surfaces of said channel. The convex surfaces 34a of the ribs 34 on both sides of the bolster and the concave bottom surfaces 33a of the vertical channels 33 in both of the column guides 15 are all curved about a common center, thereby forming a swivel joint connection between the bolster and the column guides of the side frame that permits horizontal angling movement therebetween, which movement is limited by the plane sides or flanges 33b of the channel-shaped column guides.

When the truck is traveling on a curved track, the swivel joint connections between the bolster and side frames permit one frame to run in advance of the other and the bolster to accommodate itself to such movement; and there is sufficient play in said joints to permit the bolster to tilt endwise when one side frame is raised above the level of the other side frame. In these swivel joints, the lugs or flanges which limit the horizontal angling movement of the bolster, are on the column guides and not on the bolster, thereby permitting accurate and economical casting of the bolster by eliminating the use of cores heretofore employed to define such lugs and enabling the convex ribs of the bolster to be formed by a direct part of the bolster pattern.

Obviously, the hereinbefore described swivel joint construction may be embodied in a one-piece truck side frame instead of a sectional side frame shown and described.

What I claim is:

1. A car truck comprising side frames having bolster receiving openings therein and column guides defining the sides of said openings, and a bolster extending into said openings, the bolster opposing side of each of said column guides having a vertical channel formed therein with a continuous transversely concave bottom surface terminating near the ends of the bolster opening in plane side surfaces that diverge towards the bolster and make relatively wide obtuse angles with said concave bottom surface, and each of the column opposing sides of said bolster having an outstanding vertical rib thereon that seats in an adjacent channel and has a continuous transversely convex surface cooperating with the concave bottom surface thereof, and plane side surfaces that converge towards said convex surface and conform to and cooperate with said plane side surfaces of said channel, the convex surfaces on both sides of said bolster and the concave surfaces of both of said column guides being all curved about a common center.

2. A truck side frame having an opening adapted to receive a bolster, and column guides defining the sides of said opening, said column guides having vertical channels in opposing sides thereof adapted to form seats for correspondingly shaped ribs on said bolster, each of said channels having a continuous transversely concave bottom surface terminating close to the ends of the bolster openings in plane side surfaces that diverge towards said bolster openings and make relatively wide obtuse angles with said concave bottom surface, the concave bottom surfaces of the channels of both of said column guides being curved about a common center.

FRANCES DREIBUSS,
*Administratrix of the Estate of Harry C. Dreibuss, Deceased.*

FRED H. SPENNER.